United States Patent
Bist et al.

(10) Patent No.: US 7,471,788 B2
(45) Date of Patent: Dec. 30, 2008

(54) ECHO CANCELLERS FOR SPARSE CHANNELS

(75) Inventors: Anurag Bist, Newport Beach, CA (US); Stan Hsieh, Diamond Bar, CA (US); Neil J. Bershad, Newport Beach, CA (US)

(73) Assignee: Intel Corporation, Santa Clara, CA (US)

(*) Notice: Subject to any disclaimer, the term of this patent is extended or adjusted under 35 U.S.C. 154(b) by 1320 days.

(21) Appl. No.: 10/304,641

(22) Filed: Nov. 25, 2002

(65) Prior Publication Data

US 2004/0101131 A1 May 27, 2004

(51) Int. Cl.
    *H04M 9/08* (2006.01)
(52) U.S. Cl. .................................. 379/406.01
(58) Field of Classification Search .............................. 379/406.01–406.16
    See application file for complete search history.

(56) References Cited

U.S. PATENT DOCUMENTS

| | | | |
|---|---|---|---|
| 5,699,424 A * | 12/1997 | Hirano | 379/406.11 |
| 5,857,167 A * | 1/1999 | Gritton et al. | 704/223 |
| 6,028,929 A | 2/2000 | Laberteaux | |
| 6,181,794 B1 * | 1/2001 | Park et al. | 379/406.08 |
| 6,718,035 B2 * | 4/2004 | Younce et al. | 379/406.01 |
| 2002/0093919 A1 | 7/2002 | Bershad et al. | |
| 2003/0219113 A1 | 11/2003 | Bershad et al. | |
| 2004/0037417 A1 * | 2/2004 | Seibert | |

OTHER PUBLICATIONS

Gansler et al, :A Robust Proportionate Affine Projection Algorithm for Network Echo cancellation, 2000. IEEE Int. Conf. on Acoustic, Speech, and Signal Processing (ASSP-'00), vol. 2, Jun. 5-9, 2000, pp. II793-II796.*

* cited by examiner

*Primary Examiner*—Ramnandan Singh
(74) *Attorney, Agent, or Firm*—Blakely, Sokoloff, Taylor & Zafman LLP

(57) ABSTRACT

The present invention is an echo canceller for sparse channels in an echo channel. The echo channel receives a far-end input and a near-end input. An enable generator asserts a sparse update enable in response to detecting at least one of the double talk condition and an impulse response change. A main weight updater transfers shadow weights of the shadow filter to N sets of sparse weights in N sparse filters of the main filter according to the sparse update enable. A sparse main filter filters the far-end input non-adaptively to generate a main output. A long shadow filter filters the far-end input adaptively to generate a shadow output and to estimate delays of peaks of the sparse weights in the main filter.

35 Claims, 11 Drawing Sheets

ECHO CANCELLERS FOR SPARSE CHANNELS

BACKGROUND

1. Field

Embodiments of the invention relate to the field of communication, and more specifically, to echo cancellation.

2. Background

Acoustic echo is an inherent problem in the design of speech processing equipment such as telephone network and wireless handsets. Echo cancellation is a technique to reduce the amount of echo in the voice transmission by estimating the echo picked up on the microphone or line on the transmitting side and subtracts it from the ear piece or hands-free speaker on the receiver side. Since the exact model of the environment is not known and time-varying, adaptive techniques are typically used to estimate the echo.

There are two non-trivial real-world problems in echo cancellation: double-talk and changes in impulse response due to loudspeaker enclosure microphone (LEM) changes. Double-talk is caused by the simultaneous generation of speech signals from both the far-end and near-end ports of an electronic duplexer for a four-wire communication system. LEM changes are caused by various local changes such as movements of speaker, environmental noise, and temperature variations. These two problems require opposite behavior on the part of the echo canceller. Double-talk requires that the adaptive weights to be held unchanged, i.e., no adaptation whereas LEM changes require quick adaptation. In addition, when the channel impulse responses are sparse, the computations may be inefficient and may not be accurate.

BRIEF DESCRIPTION OF THE DRAWINGS

The invention may best be understood by referring to the following description and accompanying drawings that are used to illustrate embodiments of the invention. In the drawings.

DESCRIPTION

Figure 1:
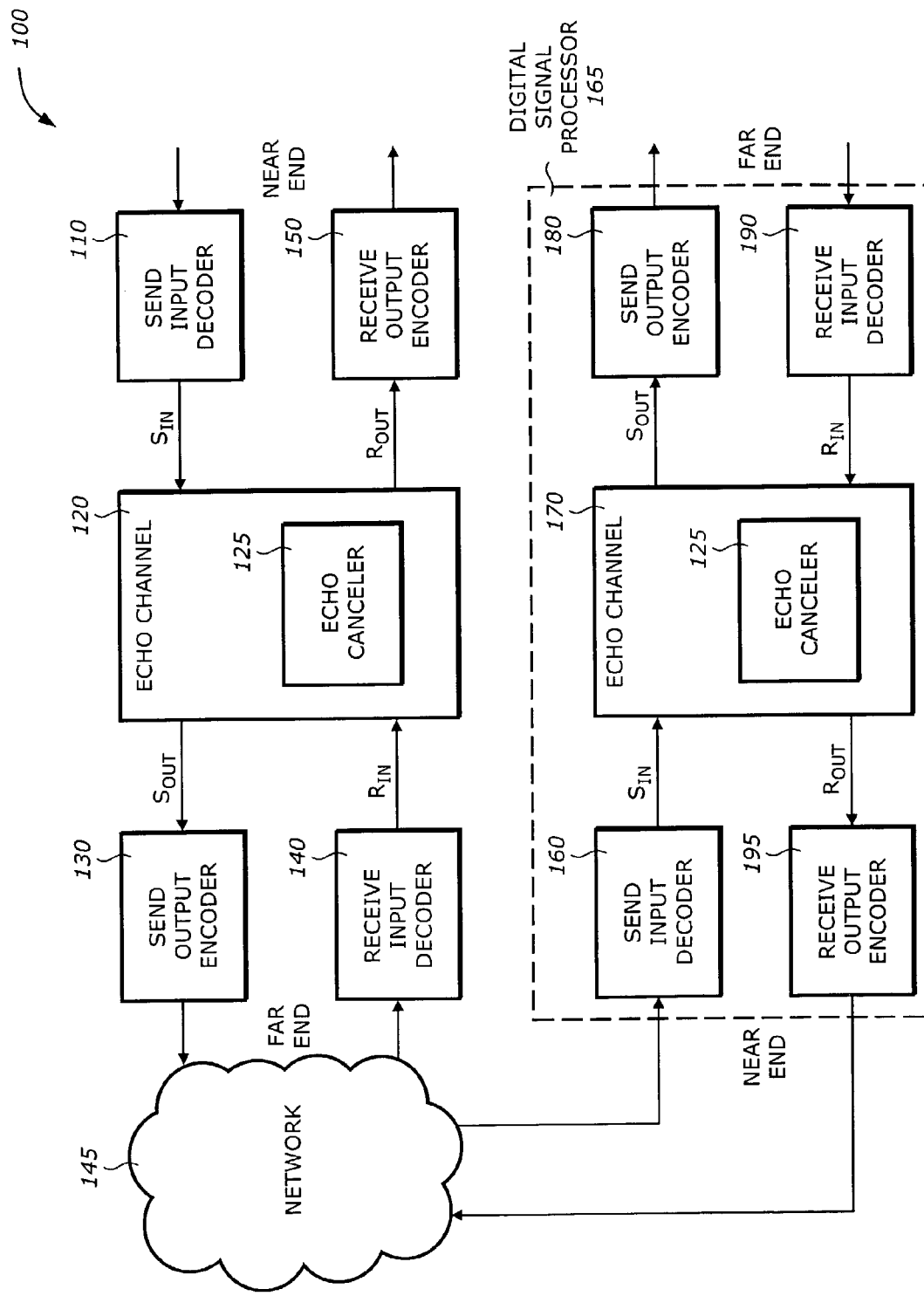
FIG. 1 is a diagram illustrating a system in which one embodiment of the invention can be practiced.

The present invention is an echo canceller for sparse channels in an echo channel. The echo channel receives a far-end input and a near-end input. An enable generator asserts a sparse update enable in response to detecting at least one of the double talk condition and an impulse response change. A main weight updater transfers shadow weights of the shadow filter to N sets of sparse weights in N sparse filters of the main filter according to the sparse update enable. A sparse main filter filters the far-end input non-adaptively to generate a main output. A long shadow filter filters the far-end input adaptively to generate a shadow output and to estimate delays of peaks of the sparse weights in the main filter.

In the following description, numerous specific details are set forth. However, it is understood that embodiments of the invention may be practiced without these specific details. In other instances, well-known circuits, structures, and techniques have not been shown in order not to obscure the understanding of this description.

Elements of one embodiment of the invention may be implemented by hardware, firmware, software or any combination thereof. When implemented in software, the elements of an embodiment of the present invention are essentially the code segments to perform the necessary tasks. The software may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The term "data" here refers to any type of information that is encoded for machine-accessible purposes. Therefore, it may include program, code, data, file, etc.

All or part of an embodiment of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

FIG. 1 is a diagram illustrating a system 100 in which one embodiment of the invention can be practiced. The system 100 includes a send input decoder 110, an echo channel 120, a send output decoder 130, a receive input decoder 140, a receive output encoder 150, a network 145, a send input decoder 160, an echo channel 170, a send output decoder 180, a receive input decoder 190, and a receive output encoder 195.

The send input decoder 110 receives the encoded speech from a first near end and decodes the encoded speech into linear speech data $S_{in}$. In one embodiment, the send input decoder 110 is a μ-Law/A-Law decoder. The echo channel 120 includes an echo canceller 125. The echo canceller 125 removes an echo estimated signal from the linear data samples $S_{in}$ to generate linear data samples $S_{out}$. The send output encoder 130 provides speech compression before packetizing. In one embodiment, the send output encoder 130 is a G.7xx encoder which compresses the speech data $S_{out}$ from the echo channel 120 using any one of the compression standards for low-bit rate voice (LBRV) including the International Telecommunication Union (ITU)-T internationally standardized G.7xx series. The compressed speech data are sent to the far end via a network. The receive input decoder 140 de-compresses the speech data received from the first far end over the network 145. The de-compression technique is compatible with the compression used in the send output encoder 130. The echo channel 120 receives the $R_{in}$ from the receive input decoder 140 and sends out the $R_{out}$ linear data samples. The receive output encoder 150 encodes the linear data samples $R_{out}$ into μ-Law and A-law encoded speech to be sent out to the first near end.

The network 145 is any network having capability to transmit packetized data from and to the send output decoder 130, the send input decoder 160, the receive input decoder 140, and the receive output decoder 195. The network 145 may be the Internet, an intranet, an extranet, a local area network (LAN), or a wide area network (WAN). The send input decoder 160 receives the encoded speech from the network 145 and decodes the encoded speech into linear speech data $S_{in}$. In one embodiment, the send input decoder 160 is a μ-Law/A-Law decoder. The echo channel 170 includes an echo canceller 175. The echo canceller 175 removes an echo estimated signal from the linear data samples $S_{in}$ to generate linear data samples $S_{out}$. The send output encoder 180 provides speech compression before packetizing. In one embodiment, the send output encoder 180 is a G.7xx encoder which compresses the speech data $S_{out}$ from the echo channel 170 using any one of the compression standards for low-bit rate voice (LBRV) including the International Telecommunication Union (ITU)-T internationally standardized G.7xx series. The compressed speech data are sent to a receiving device at the second far end. The receive input decoder 190 de-compresses the speech data received from the second far end. The de-compression technique is compatible with the compression used in the send output encoder 180. The echo channel 170 receives the $R_{in}$ from the receive input decoder 190 and sends out the Rout linear data samples. The receive output encoder 190 encodes the linear data samples $R_{out}$ into μ-Law and A-law encoded speech to be sent out to the second near end to the network 145. In one embodiment, the send input decoder 160, the echo channel 170, the send output decoder 180, the receive input decoder 190, and the receive output encoder 195 are integrated into a digital signal processor 165.

In the following description, the superscript T denotes a transposition of a vector or a matrix, the symbol * denotes a multiplication, ||.|| denotes an absolute value.

Figure 2:
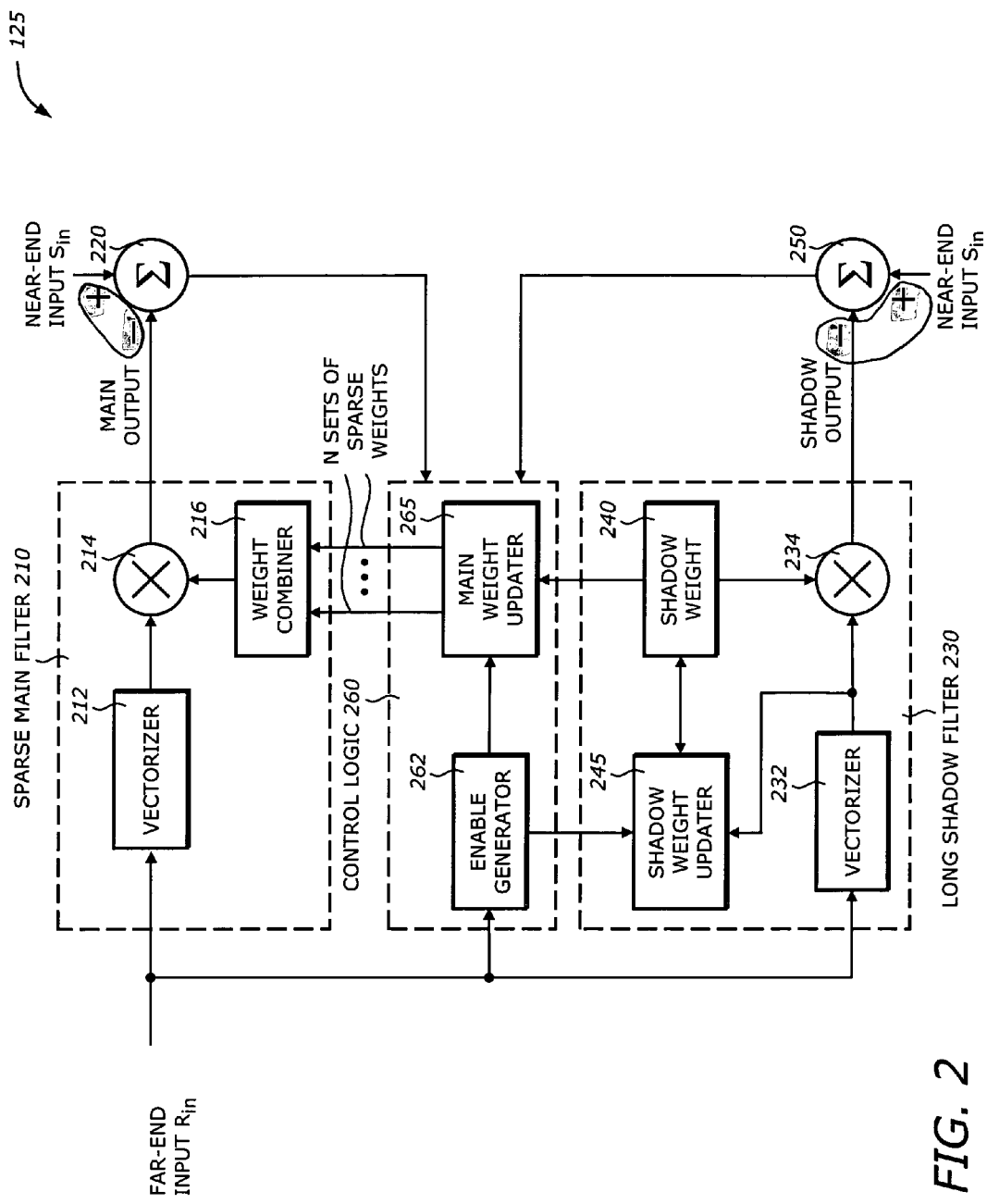
FIG. 2 is a diagram illustrating an echo canceller according to one embodiment of the invention.

FIG. 2 is a diagram illustrating an echo canceller 125 according to one embodiment of the invention. The echo canceller 125 includes a main filter 210, a subtractor 220, a shadow filter 230, a subtractor 250, and a control logic 260.

The sparse main filter 210 is a short or sparse filter. It filters the far-end input $R_{in}$ non-adaptively or without adaptation to generate a main output $y_m(k)$. The main filter 210 includes a vectorizer 212, a multiplier 214, and a weight combiner 216. The vectorizer 212 delays the far-end input $R_{in}$ by a tapped delay line to generate the vector u(k). The vectorizer 212 may be implemented by a buffer memory, a shift register, or an indexed array. The multiplier 214 multiplies the u(k) with the combined weights Wc(k) provided by the weight combiner 216 to perform the filtering process as follows:

$$y_m(k)=u(k)*Wc(k)^T \tag{1}$$

The weight combiner 216 combines or merges N sets of sparse weights $Wm_1, Wm_2, \ldots, Wm_N$ of the main filter 210 to generate the combined weights Wc(k) as follows:

$$Wc(k) = Wm_1(k) \text{ for } 1 \le k \le ND \tag{2}$$

$$= \sum_{i=1}^{N} Wm_i(k) \text{ otherwise} \tag{3}$$

where ND is a coupling distance. The coupling distance is used to detect double talk and will be discussed later.

The subtractor 220 subtracts the near-end input $S_{in}$ from the main output to generate a main error $e_m(k)$ as follows:

$$e_m(k)=S_{in}(k)-y_m(k) \tag{4}$$

The main error $e_m(n)$ is used by the control logic to generate enable for updating the sparse weights $Wm_i(k)$ where i=1, ..., N.

The shadow filter 230 is a long adaptive filter. It filters the far-end input $R_{in}$ adaptively or with adaptation to generate a shadow output $y_s(k)$. In one embodiment, the adaptation rule is the Affine Projection (AP) of order 2, AP(2), adaptation or update rule. The shadow filter 230 includes a vectorizer 232, a multiplier 234, shadow weights Wsh 240, and a shadow weight updater 245. The vectorizer 232 is similar to the delay line 212 and can be shared with the main filter 210. The vectorizer 232 delays the far-end input $R_{in}$ by a tapped delay line to generate the vector u(k). The multiplier 230 multiplies the vector u(k) with the shadow weights Wsh 240 to perform the filtering process as follows:

$$y_s(k)=u(k)*Wsh(k)^T \tag{5}$$

The shadow weight updater 245 updates the shadow weights Wsh using the AP(2) adaptation rule when enabled by the control logic 260.

The subtractor 250 subtracts the near-end input $S_{in}$ from the shadow output $y_s(k)$ to generate a shadow error $e_s(k)$ as follows:

$$e_s(k)=S_{in}(k)-y_s(k) \tag{6}$$

The shadow error $e_s(k)$ is used by the control logic 260 to generate the sparse update enable. It is also used to update the shadow weights Wsh using the AP(2) rule as follows:

$$\hat{a}(k)=(U^T(k)*U(k))^{-1}*U^T(k)*u(k) \quad (7)$$

$$\phi(k)=u(k)-U(k)*\hat{a}(k) \quad (8)$$

$$Wsh(k+1)=Wsh(k)+[\phi(k)/(\phi(k)*\phi^T(k))]*e_s(k) \quad (9)$$

where U(k) is a collection of P past vectors U(k)=[u(k−1), u(k−2), ..., u(k−P)].

The control logic 260 performs a number of functions to control the filtering operations and the weight updating of the main and shadow filters 210 and 230. The control logic receives the far-end input $R_{in}$, and the main and shadow errors $e_m(k)$ and $e_s(n)$. The control logic 260 includes an enable generator 262 and a main weight updater 265. The enable generator 262 generates a shadow update enable to enable the shadow weight updater 245 in the shadow filter 230. It also generates a sparse update enable to enable the main weight updater 265. It asserts the sparse update enable in response to detecting at least one of a double talk condition and an impulse response change such as a loudspeaker enclosure microphone (LEM) condition in the echo channel. The main weight updater 265 updates the N sets of sparse weights in N sparse filters of the main filter 210 using subsets of the shadow weights Wsh 240 when the sparse update enable is asserted.

Figure 3:
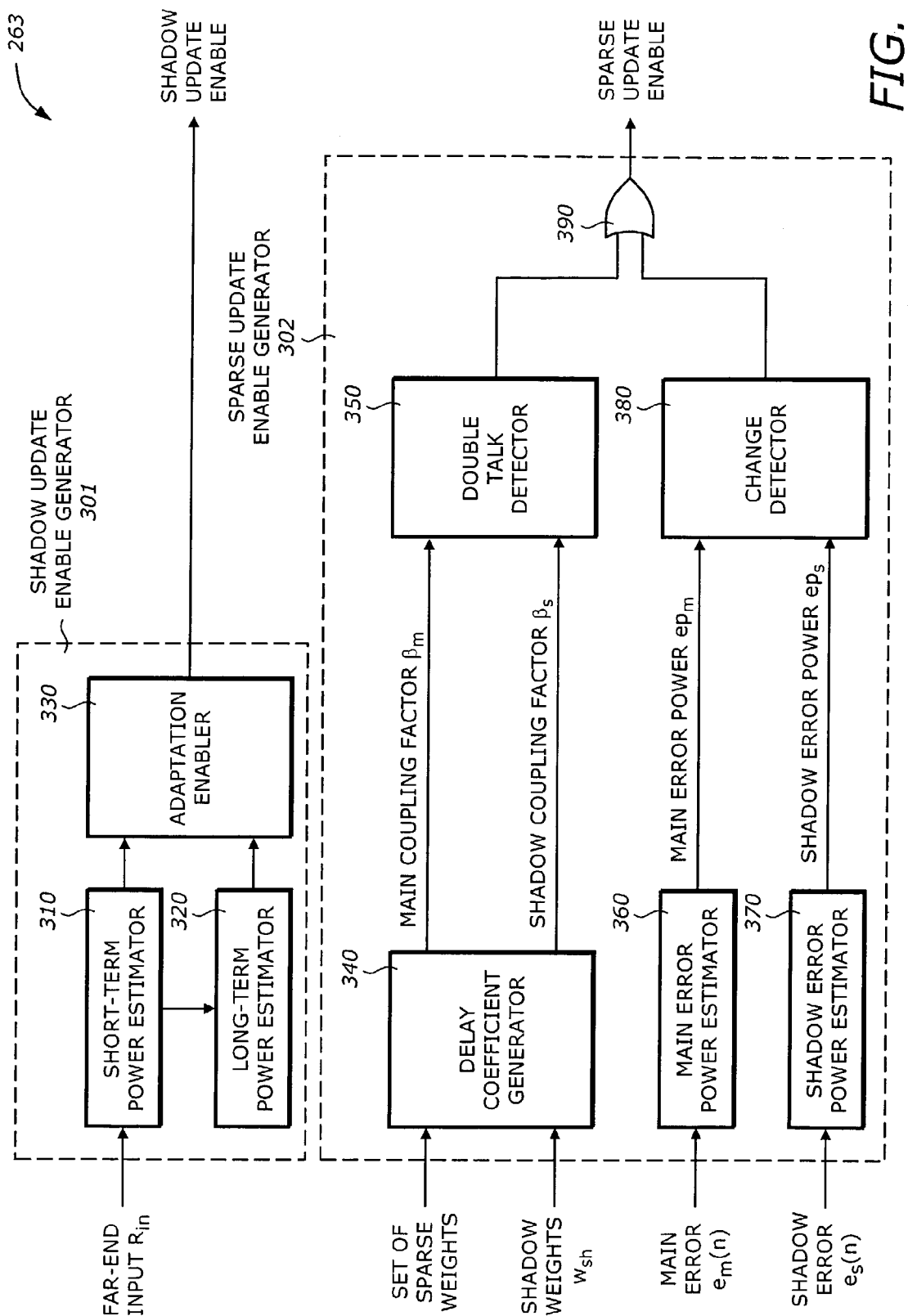
FIG. 3 is a diagram illustrating an enable generator shown in FIG. 2 according to one embodiment of the invention.

FIG. 3 is a diagram illustrating the enable generator 262 shown in FIG. 2 according to one embodiment of the invention. The enable generator 262 includes a shadow update enable generator 301 and a sparse update enable generator 302.

The shadow update enable generator 301 generates the shadow update enable. The shadow update enable, when asserted, enables the shadow weight updater 245 (FIG. 2) to update the shadow weights Wsh 240 (FIG. 2). It includes a short-term power estimator 310, a long-term power estimator 320, and an adaptation enabler 330. The short-term power estimator 310 estimates a short-term power $p_S$ of the far-end input $R_{in}$ as follows:

$$x_1(k)=\|R_{in}(k-M+1)\|^2 \quad (10)$$

if $x_1(k)>p_S(k-1)$ then $p_S(k)=(1-\gamma_r)x_1(k)+\gamma_r p_S(k-1)$ (11)

else $p_S(k)=(1-\gamma_f)x_1(k)+\gamma_f p_S(k-1)$ (12)

where:

$\gamma_r$ and $\gamma_f$ are time constants related to the number of past samples, having typical values of 1−(1/24) and 1−(1/240), respectively; M is the number of taps of the shadow filter; M1 is the number of taps of each of the sparse filters. In one embodiment, M=512+ND=544 and M1=128.

The long-term power estimator 320 estimates a long-term power $p_L$ of the far-end input $R_{in}$ as follows:

if $p_S(k)>r_1 p_L(k-1)$ then $p_L(k)=(1-\alpha)x_1(k)+\alpha p_L(k-1)$ (13)

else $p_L(k)=p_L(k-1)$ (14)

where $r_1$ is a positive integer, having typical values of from 4 to 10.

The adaptation enabler 330 generates the shadow update enable. It asserts the shadow update enable to enable adaptation of the shadow filter 230 in response to the short-term power $p_S$ exceeding an indication of the long-term power $p_L$. The indication of the long-term power is a multiple of the long-term power, e.g., $r_1 p_L$, where $r_1$ is a positive integer. In other words, the shadow weights Wsh(k) are updated when $P_s>r_1 p_L$. In one embodiment, $r_1$ ranges from 4 to 10.

The sparse update enable generator 302 includes a delay coefficient generator 340, a double talk detector 350, a main error power estimator 360, a shadow error power estimator 370, an impulse response change detector 380, and a combiner 390. The delay coefficient generator 340 computes a main coupling factor $\beta_m$ for the main filter 210 and a shadow coupling factor $\beta_s$ for the shadow filter 230 as follows:

$$\beta_m=(M/ND)*[Wm(1:ND)*Wm(1:ND)^T] \quad (15)$$

$$\beta_s=(M/ND)*[Wsh(1:ND)*Wsh(1:ND)^T] \quad (16)$$

where Wm(1:ND) and Wsh(1:ND) refer to the first ND weights of the sparse weights and the shadow weights; ND is the coupling distance with value depending on the filter size M and M1. In one embodiment, M=544, M1=128, and ND=32.

The double talk detector detects the double talk condition in response to the main coupling factor $\beta_m$ exceeding an indication of the shadow coupling factor $\beta_s$. The indication of the shadow coupling factor $\beta_s$ is a multiple of $\beta_s$, i.e., $r_2*\beta_s$, where $r_2$ is a positive integer. In one embodiment, $r_2=2$. In other words, the condition is $\beta_m$ is $>2*\beta_s$. The double talk detector 350 asserts the double talk enable in response to detecting the double talk condition.

The main error power estimator 360 estimates a main error power $ep_m$ of the main error $e_m(k)$ as follows:

$$e_1(k)=\|e_m(k)\|^2 \quad (17)$$

if $e_1(k)>ep_m(k-1)$ then $ep_m(k)=(1-\gamma_r)e_1(k)+\gamma_r ep_m(k-1)$ (18)

else $ep_m(k)=(1-\gamma_f)e_1(k)+\gamma_f ep_m(k-1)$ (19)

where $\gamma_r$ and $\gamma_f$ are defined as before.

The shadow error power estimator 370 estimates a shadow error power $ep_s$ of a shadow error $e_s(k)$ as follows:

$$e_2(k)=\|e_s(k)\|^2 \quad (20)$$

if $e_2(k)>ep_s(k-1)$ then $ep_s(k)=(1-\gamma_r)e_2(k)+\gamma_r ep_s(k-1)$ (21)

else $ep_s(k)=(1-\gamma_f)e_2(k)+\gamma_f ep_s(k-1)$ (22)

The change detector 380 detects the impulse response change condition in response to the main error power $ep_m$ exceeding an indication of the shadow error power $ep_s$. The indication of the shadow error power $ep_s$ is a multiple of $ep_s$, e.g., $r_3 ep_s$, where $r_3$ is a positive integer. In one embodiment, $r_3=100$. In other words, an impulse response change is detected when $ep_m>r_3 ep_s$. The change detector 380 asserts the change enable when the change condition is detected or in response to detecting the change condition.

The combiner 390 combines the detected double talk and LEM change conditions as asserted by the double talk detector 350 and LEM detector 380, respectively, to assert the sparse update enable. If either one of these conditions is asserted, the main weight updater is enabled to update the N sets of the sparse weights in the main filter 210. In one embodiment, the combiner 350 is a logical OR operator.

Figure 4:
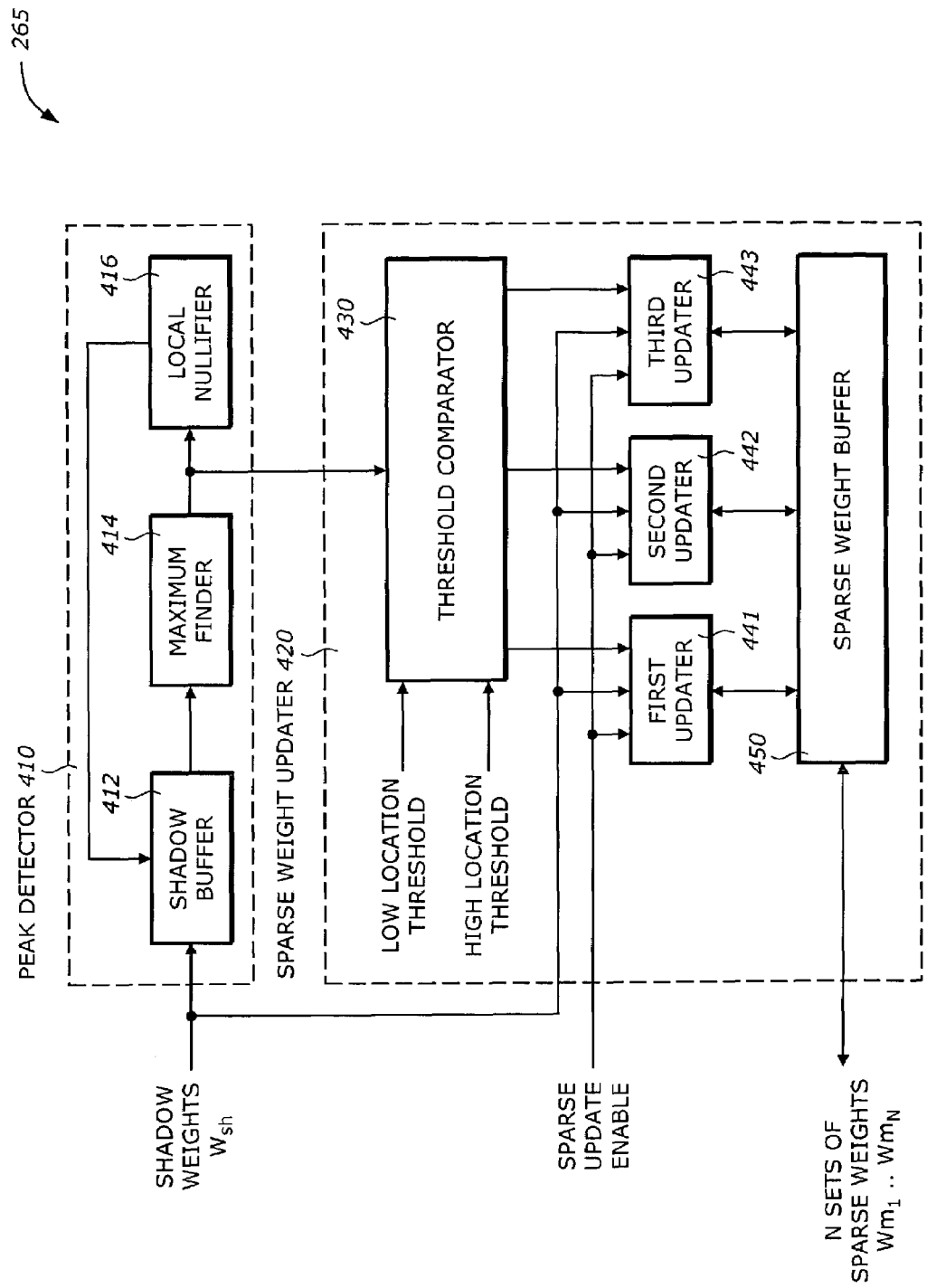
FIG. 4 is a diagram illustrating a main weight updater shown in FIG. 2 according to one embodiment of the invention.

FIG. 4 is a diagram illustrating the main weight updater 265 shown in FIG. 2 according to one embodiment of the invention. The main weight updater 265 includes a peak detector 410 and a sparse weight updater 420.

The peak detector 410 detects N peak locations of N peaks in the shadow weights Wsh 240 (FIG. 2). The peak detector 410 includes a shadow buffer 412, a maximum finder 414, and a local nullifier 416. The shadow buffer 412 stores the shadow weights Wsh 240 when the process first starts. The shadow buffer 412 is updated during the operation of the peak detector 410. The maximum finder 414 identifies or locates a location of a maximum absolute value of the shadow weights Wsh. This location corresponds to one of the N peak locations. After a location of a peak is found or identified, the nullifier 416 nullifies a subset of shadow weights Wsh located around the location. This subset is centered around the location. The width W of the subset depends on the size M of the sparse filters. In one embodiment, M ranges from 80-130 and W=50. The nullified subset is then written back to the shadow buffer 412 and the maximum finder 414 continues to look for the next peak in the updated shadow buffer 412. Each time a peak location is detected, the peak detector 410 saves the location to be used in the sparse weight updating. Typically, the number of peaks to be detected is equal to the number of sets of sparse weights $Wm_i$'s.

The sparse weight updater 420 replaces the N sets of sparse weights $Wm_i$'s based on or using the shadow weights Wsh according to the locations of the N peaks. The sparse weight updater 420 includes a threshold comparator 430, a first updater 441, a second updater 442, a third updater 443, and a sparse weight buffer 450.

The threshold comparator 430 compares the location j of the peak with a low location threshold $T_L$ and a high location threshold $T_H$ to determine how to replace the N sets of the sparse weights. In essence, the sparse weights $Wm_i(k)$ are replaced with a subset or subsets of the shadow weights Wsh. The subsets are identified by the location indices as follows:

First subset: for index k between 1 and M1+ND, where ND is the coupling distance.
Second subset: for index k between 1 and ND
Third subset: for index k between $M-N1+1 \leq k \leq M$
Fourth subset: for index k between j−M1/2 and j+M1/2, i.e., j is the peak location and is the center of the fourth subset.

The replacement or updating of the sparse filter $Wm_i(k)$ is performed according to the equations below:

If $j \leq T_L$, then $Wm_i(k)=Wsh(k)$ for $1 \leq k \leq M1+ND$ (first subset), and $Wm_i(k)=0$ otherwise If $j \geq T_H$, then $Wm_i(k)=Wsh(k)$ for $1 \leq k \leq ND$ (second subset), and
$M-M1+1 \leq k \leq M$ (third subset), and $Wm_i(k)=0$ otherwise If $T_{H<j<TL}$, then $Wm_i(k)=Wsh(k)$ for $1 \leq k \leq ND$ (second subset), and
$j-M1/2 \leq k \leq j+M1/2$ (fourth subset), and $Wm_i(k)=0$, otherwise.

The first updater 441 replaces a first sparse subset of one of the N sets of the sparse weights by a first shadow subset of the shadow weights in response to the location being less than the low location threshold $T_L$. The second updater 442 replaces a second sparse subset and a third sparse subset of the one of the N sets of the sparse weights by a second shadow subset and a third shadow subset of the shadow weights, respectively, in response to the location exceeding the high location threshold $T_H$. The third updater 443 replaces the second sparse subset and a fourth sparse subset of the one of the N sets of the sparse weights by the second shadow subset and a fourth shadow subset of the shadow weights, respectively, in response to the location being between the low and high location thresholds $T_L$ and $T_H$. The fourth shadow subset is centered around the location.

Figure 5:
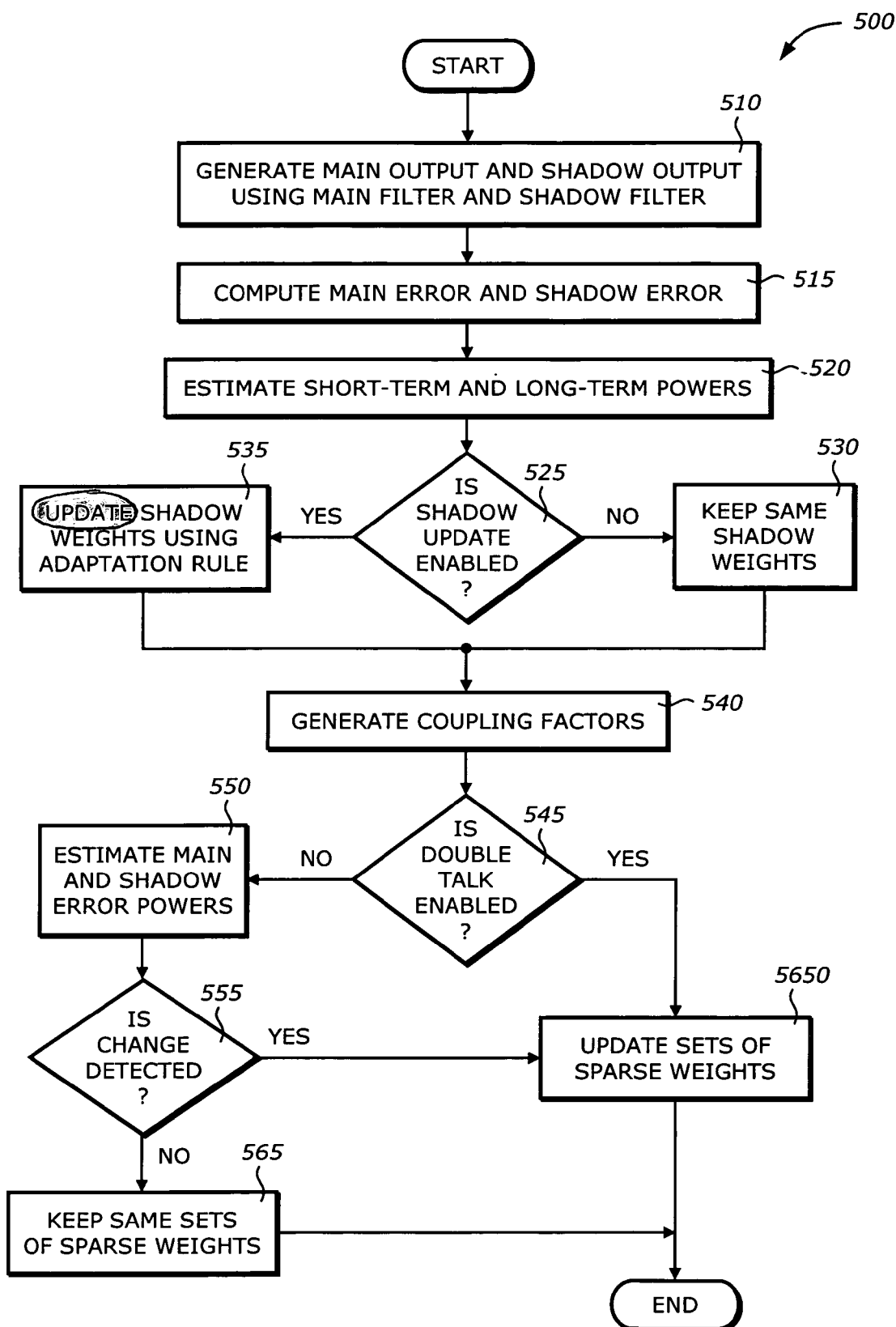
FIG. 5 is a flowchart illustrating a process to perform echo cancellation according to one embodiment of the invention.

FIG. 5 is a flowchart illustrating a process 500 to perform echo cancellation according to one embodiment of the invention.

Upon START, the process 500 generates the main output and the shadow output using the main filter and the shadow filter, respectively (Block 510). This is accomplished by delaying the far-end input and multiplied the delayed far-end input with the respective filter weights. Next, the process 500 computes the main error and the shadow error (Block 515). This is accomplished by subtracting the near-end input from the main output and the shadow output, respectively.

Then, the process 500 estimates the short-term and long-term powers in the far-end input (Block 520). Next, the process 500 determines if the shadow update is enabled (Block 525). This is accomplished by comparing the short-term power to an indication of the long-term power. If the shadow update is enabled, the process 500 updates the shadow weights using the AP adaptation rule (Block 535). Otherwise, the process 500 keeps the same shadow weights (Block 530).

Next, the process 500 generates the main and shadow coupling factors (Block 540). Then, the process 500 determines if a double talk condition has been detected (Block 545). This is accomplished by comparing the main coupling factor to an indication of the shadow coupling factor. If a double talk condition is detected, the process 500 updates the N sets of the sparse weights (Block 560) and the process 500 is terminated. Otherwise, the process 500 estimates the main and shadow error powers (Block 550). Then, the process 500 determines if an impulse response change condition has been detected (Block 555). This is accomplished by comparing the main error power to an indication of the shadow error power. If an impulse response change condition has been detected, the process 500 updates the N sets of the sparse weights (Block 560) and is then terminated. Otherwise, the process 500 keeps the N sets of the sparse weights the same and is then terminated.

Figure 6:
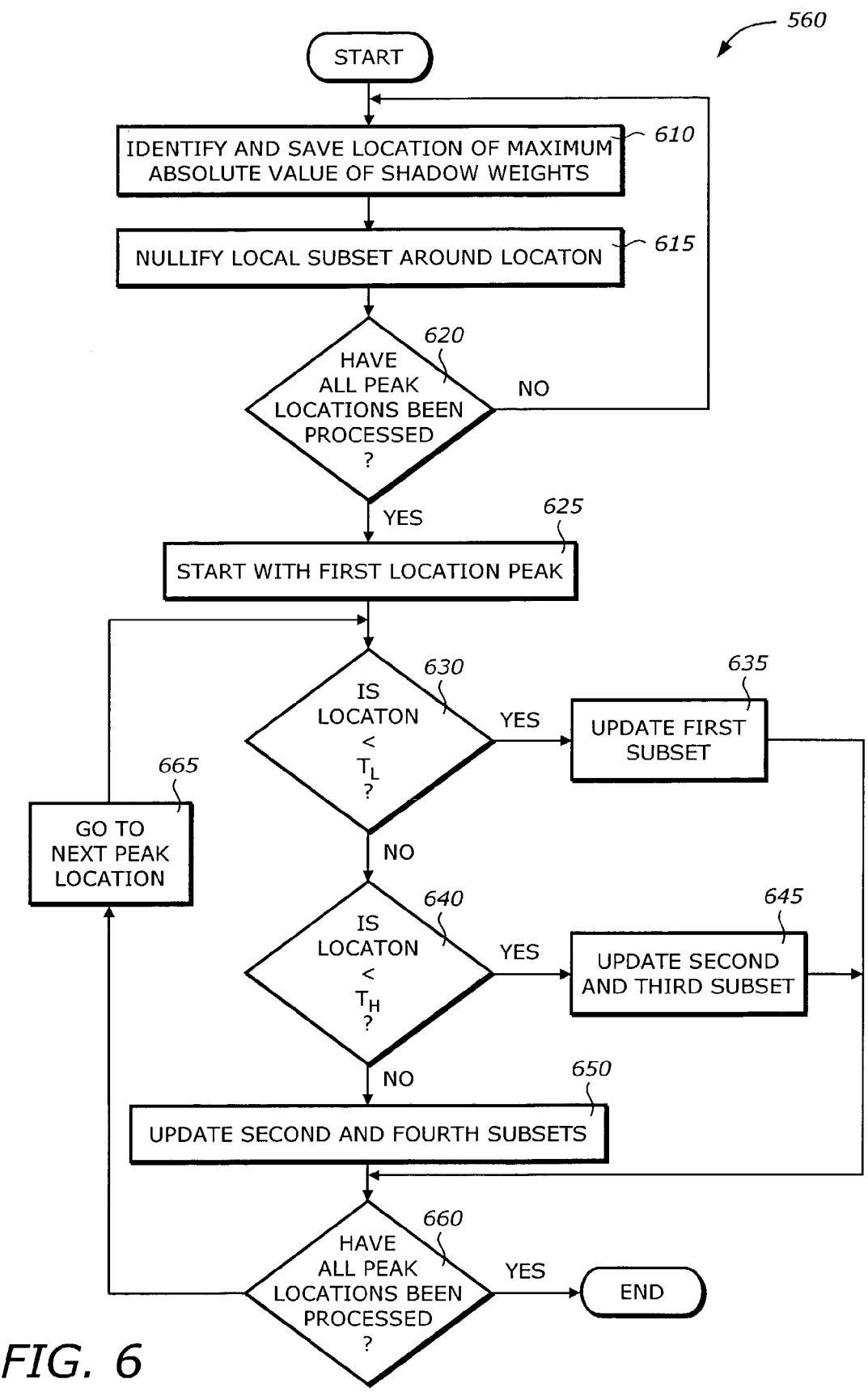
FIG. 6 is a flowchart illustrating a process to update sets of sparse weights shown in FIG. 5 according to one embodiment of the invention.

FIG. 6 is a flowchart illustrating the process 560 to update sets of sparse weights shown in FIG. 5 according to one embodiment of the invention.

Upon START, the process 560 identifies or locates and saves location of a maximum absolute value of the shadow weights (Block 610). This location corresponds to a peak location in the shadow weights. Next, the process 5650 nullifies a local subset around the location (Block 615) having the location as the center. Then, the process 560 determines if all the sets have been processed (Block 620). If not, the process 560 returns to Block 610 to continue looking for the next peak location.

If all the sets have been processed, the process 560 starts with the first peak location (Block 625). Next, the process 560 determines if the peak location is less than the low location threshold (Block 630). If so, the process 560 updates the first subset of the sparse weights (Block 635) and proceeds to Block 660. Otherwise, the process 560 determines if the peak location is greater than or exceeds the high location threshold (Block 640). If so, the process 560 updates the second and third subsets of the sparse weights (Block 645) and proceeds to Block 660). Otherwise, the process 560 updates the second and the fourth subsets of the sparse weights (Block 650).

Then, the process 560 determines if all peak locations have been processed (Block 660). If not, the process 560 goes to the next peak location (Block 665) and return to Block 630). If all peak locations have been processed, the process 560 is terminated.

FIGS. 7-11 show results of a simulation. The parameters are M=512+32=544 and M1=140 for three type 1 filters with delays at 8, 160, and 320 for the first 100,000 iterations and then filters with delays at 88, 240, and 400.

Figure 7:
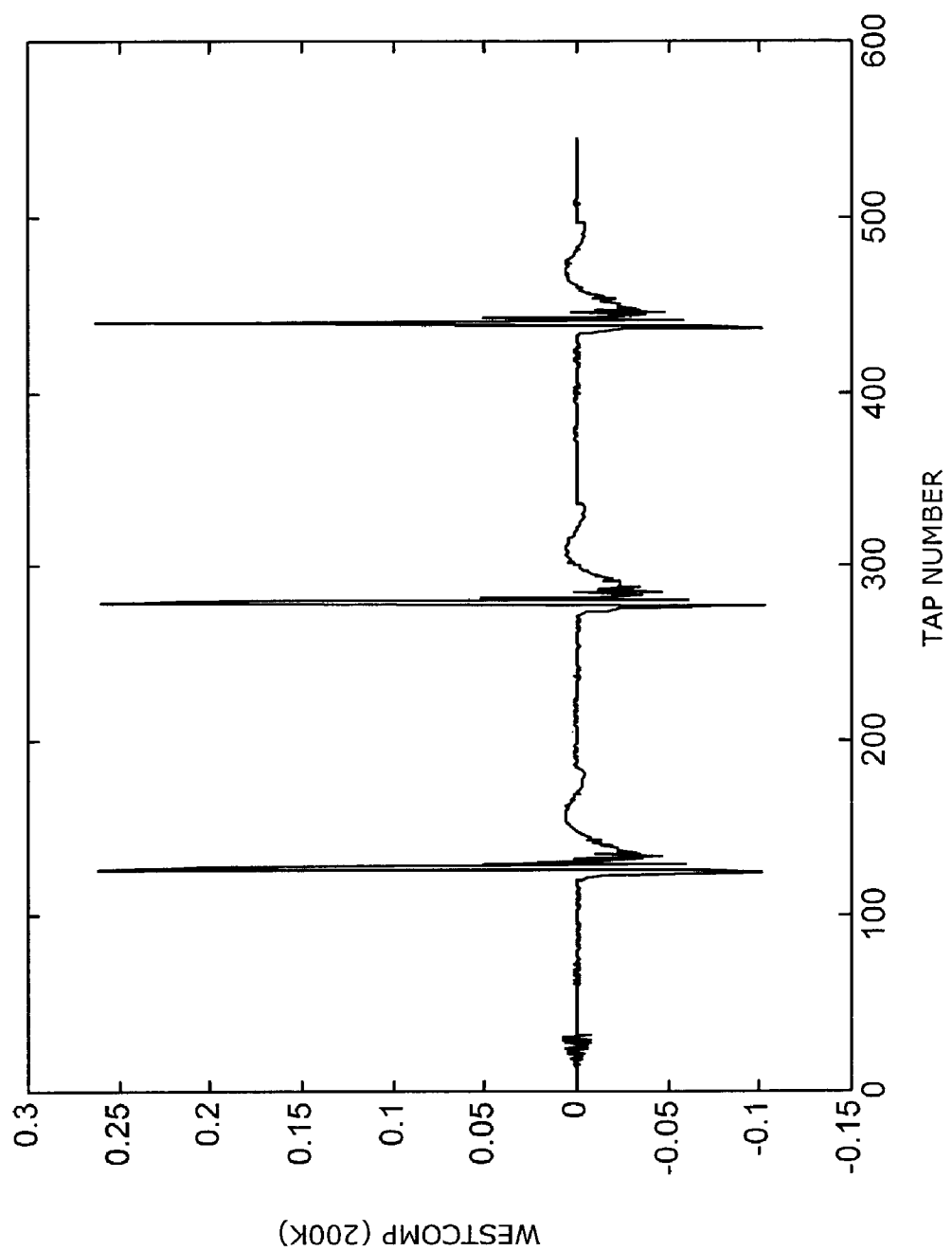
FIG. 7 is a diagram illustrating a combined main weight after 200K iterations according to one embodiment of the invention.
Figure 8:
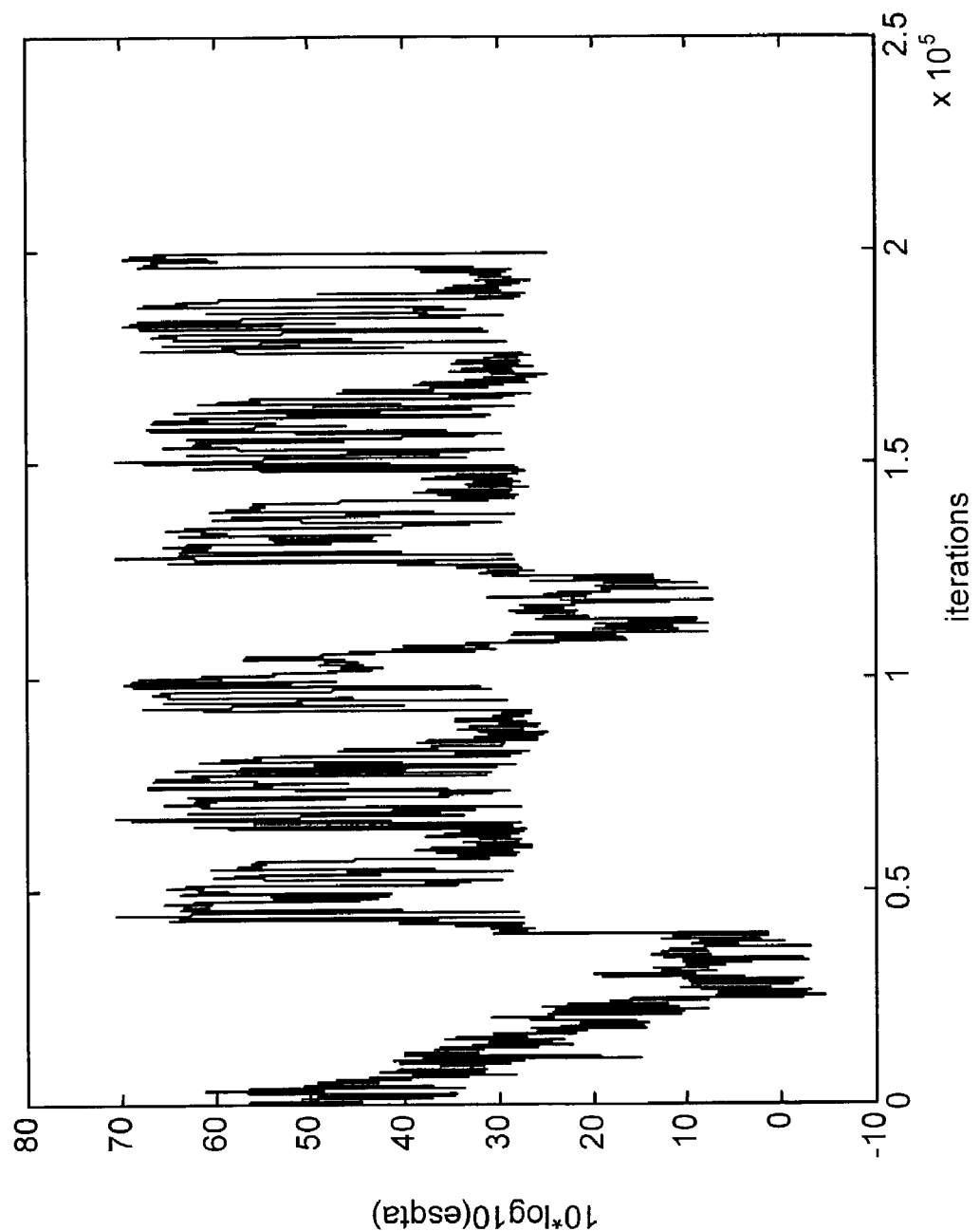
FIG. 8 is a diagram illustrating a smoothed mean square error (MSE) according to one embodiment of the invention.
Figure 9:
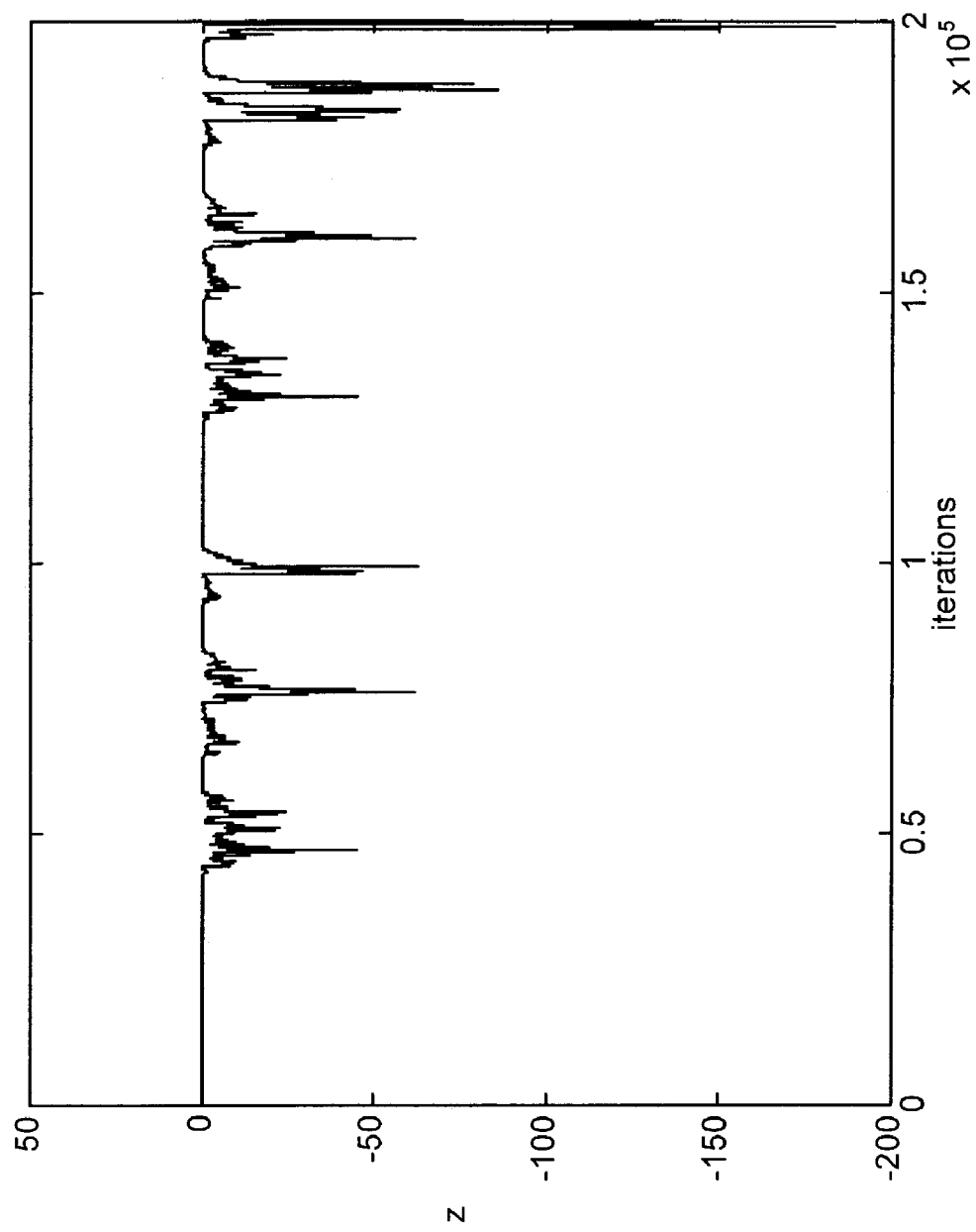
FIG. 9 is a diagram illustrating a double talk condition using delay coefficients according to one embodiment of the invention.
Figure 10:
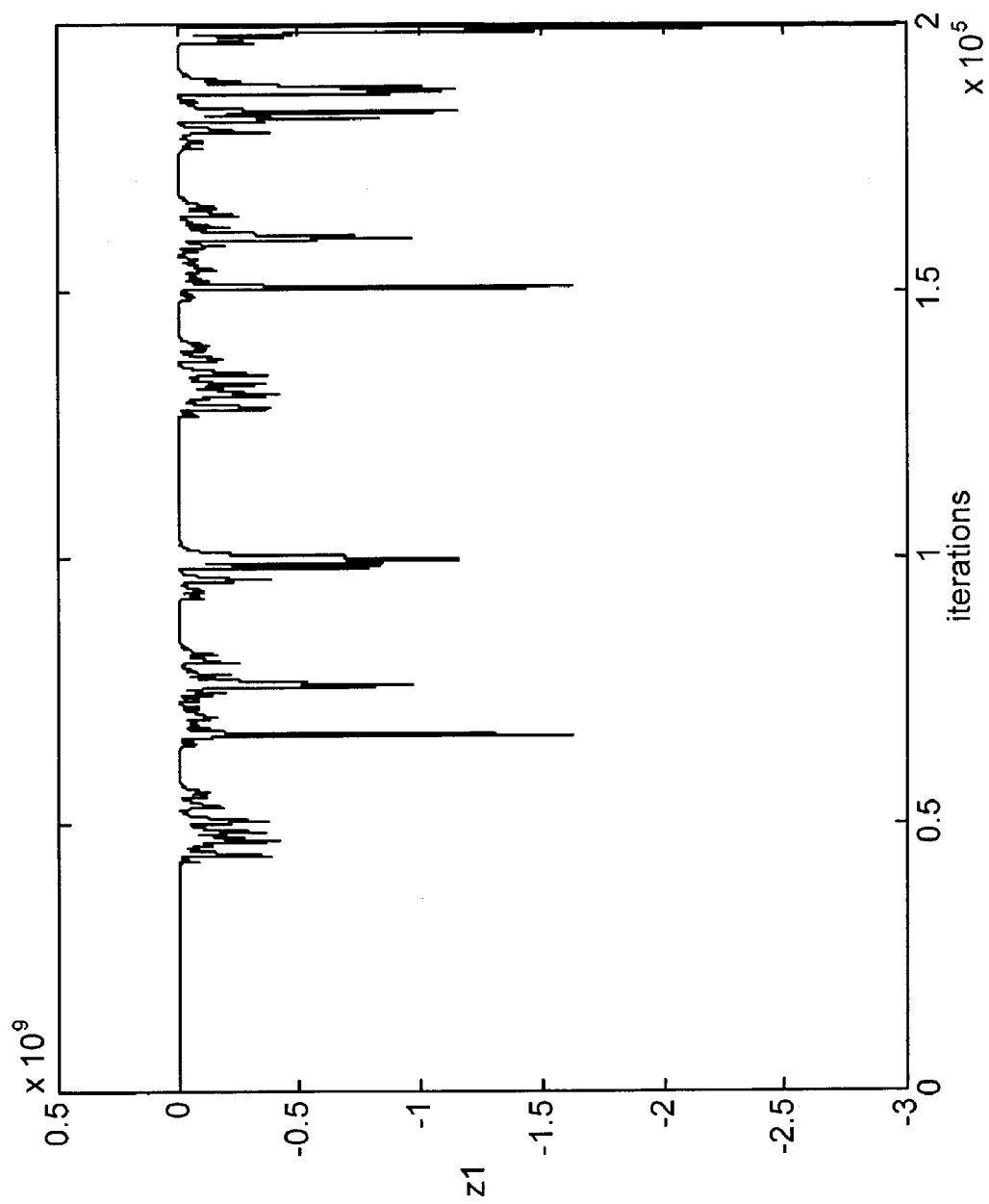
FIG. 10 is a diagram illustrating a smoothed LEM change condition according to one embodiment of the invention.
Figure 11:
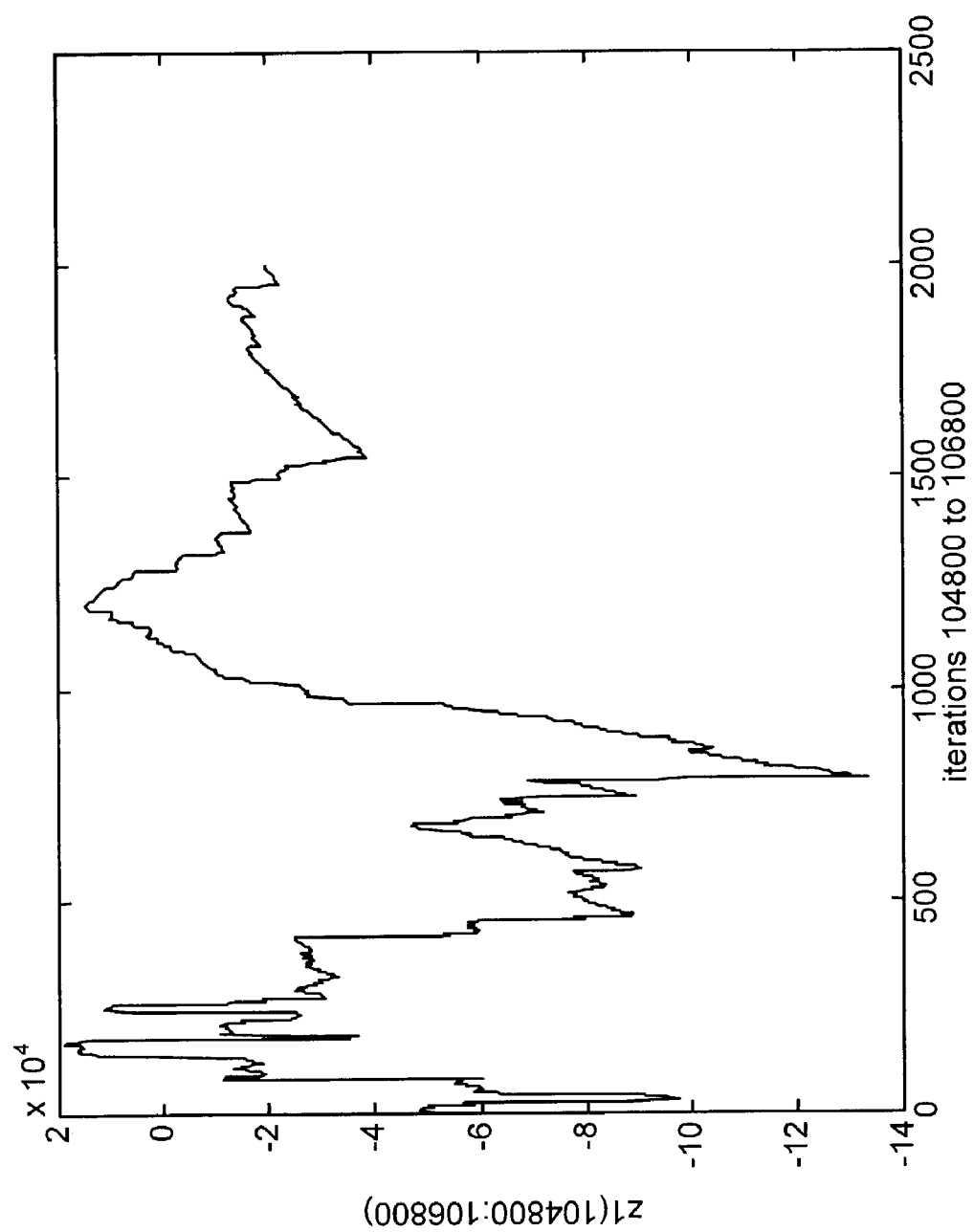
FIG. 11 is a diagram illustrating a smoothed LEM change condition at iterations 104800 to 106800 according to one embodiment of the invention.

FIG. 7 is a diagram illustrating a combined main weight after 200K iterations according to one embodiment of the invention. FIG. 8 is a diagram illustrating a smoothed mean square error (MSE) according to one embodiment of the invention. FIG. 9 is a diagram illustrating a double talk condition using delay coefficients according to one embodiment of the invention. In this Figure, $z=\beta_m(k)-2\beta_s(k)$. FIG. 10 is a diagram illustrating a smoothed LEM change condition according to one embodiment of the invention. In this Figure, $z_1=ep_m-r_3ep_s$. FIG. 11 is a diagram illustrating a smoothed LEM change condition at iterations 104800 to 106800 according to one embodiment of the invention.

FIG. 8 shows there are several phases. During the first phase from 0 to 35,000 iterations, the shadow filter learns the channel impulse response. The control logic transfers the proper weights to the main filter as reflected in the main filter MSE (esqta) decreasing from about 40 dB to 0 dB. In the second phase from 35,000 to 99,000 iterations, double talk appears and is detected by both double talk detector and LEM detector as shown in FIGS. 9 and 10. The main channel filter weights are frozen while Wsh adapts on the double-talk. In the third phase from 100,000 to 125,000 iterations, the double-talk condition disappears and the LEM change occurs. The shadow filter learns the LEM change and transfers the new weight settings to the main channel filter. This procedure initially occurs for double talk detection (see FIG. 9) at around 104,000 iterations and for LEM change (see FIG. 11) at 103K iterations and again at around 105K iterations. Hence, the initial LEM change transient disappears in about ⅝ seconds. The shadow filter continues to adapt as the MSE continues to decrease (see FIG. 8). Note the cancellation is now from 40 dB to 10 dB as compared to the first learning phase. However, this is probably due to the reduced learning time. Additional training samples can reduce the cancellation performance more.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    an enable generator to assert a sparse update enable in response to detecting at least one of a double talk condition and an impulse response change in an echo channel, the echo channel receiving a far-end input and a near-end input; and
    a main weight updater to transfer shadow weights of a shadow filter to N sets of sparse weights in a main filter according to the sparse update enable, the main filter filtering the far-end input non-adaptively to generate a main output, the shadow filter filtering the far-end input adaptively to generate a shadow output, and estimating delays of peaks of the sparse weights.

2. The apparatus of claim 1 wherein the main weight updater comprises:
    a peak detector to detect N peak locations of N peaks in the shadow weights; and
    a sparse weight updater to replace the N sets of sparse weights based upon the shadow weights according to the N peak locations.

3. The apparatus of claim 2 wherein the peak detector comprises:
    a shadow buffer to store the shadow weights;
    a maximum finder to identify a location of a maximum absolute value of the shadow weights stored in the shadow buffer, the location corresponding to one of the N peak locations; and
    a nullifier to nullify a subset of shadow weights located around the location, the nullified subset being written back to the shadow buffer.

4. The apparatus of claim 3 wherein the sparse weight updater comprises:
    a threshold comparator to compare the location with a low location threshold and a high location threshold;
    a first updater to replace a first sparse subset of one of the N sets of the sparse weights by a first shadow subset of the shadow weights in response to the location being less than the low location threshold;
    a second updater to replace a second sparse subset and a third sparse subset of the one of the N sets of the sparse weights by a second shadow subset and a third shadow subset of the shadow weights, respectively, in response to the location exceeding the high location threshold; and
    a third updater to replace the second sparse subset and a fourth sparse subset of the one of the N sets of the sparse weights by the second shadow subset and a fourth shadow subset of the shadow weights, respectively, in response to the location being between the low and high location thresholds, the location being at center of the fourth shadow subset.

5. The apparatus of claim 4 wherein the sparse weight updater further comprises:
    a sparse weight buffer to store the N sets of the sparse weights.

6. The apparatus of claim 1 wherein the enable generators comprises:
    a short-term power estimator to estimate a short-term power of the far-end input;
    a long-term power estimator to estimate a long-term power of the far-end input; and
    an adaptation enabler to enable adaptation of the shadow filter in response to the short-term power being greater than an indication of the long-term power.

7. The apparatus of claim 1 wherein the enable generator comprises:
    a delay coefficient generator to compute a main coupling factor for the main filter and a shadow coupling factor for the shadow filter; and
    a double talk detector to detect the double talk condition in response to the main coupling factor being less than an indication of the shadow coupling factor.

8. The apparatus of claim 7 wherein the enable generator further comprises:
    a main error power estimator to estimate a main error power of a main error determined from the main output and the near-end input;
    a shadow error power estimator to estimate a shadow error power of a shadow error determined from the shadow output and the near-end input; and
    a change detector to detect the impulse response change in response to the main error power exceeding an indication of the shadow error power.

9. The apparatus of claim 8 wherein the enable generator further comprises:
    a combiner to combine the detected double talk and the impulse response change to assert the sparse update enable.

10. The apparatus of claim 6 wherein the adaptation enabler enables an affine projection (AP) adaptation of the shadow filter.

11. A method comprising:
asserting a sparse update enable in response to detecting at least one of a double talk condition and an impulse response change in an echo channel, the echo channel receiving a far-end input and a near-end input; and
transferring shadow weights of a shadow filter to N sets of sparse weights in a main filter according to the sparse update enable, the main filter filtering the far-end input non-adaptively to generate a main output, the shadow filter filtering the far-end input adaptively to generate a shadow output and estimating delays of peaks of the sparse weights.

12. The method of claim 11 wherein updating the N sets of sparse weights comprises:
detecting N peak locations of N peaks in the shadow weights; and
replacing the N sets of sparse weights based on the shadow weights according to the N peak locations.

13. The method of claim 12 wherein detecting the N peak locations comprises:
storing the shadow weights in a shadow buffer;
identifying a location of a maximum absolute value of the shadow weights stored in the shadow buffer, the location corresponding to one of the N peak locations; and
nullifying a subset of shadow weights located around the location, the nullified subset being written back to the shadow buffer.

14. The method of claim 13 wherein replacing the N sets of sparse weights comprises:
comparing the location with a low location threshold and a high location threshold;
replacing a first sparse subset of one of the N sets of the sparse weights by a first shadow subset of the shadow weights in response to the location being less than the low location threshold;
replacing a second sparse subset and a third sparse subset of the one of the N sets of the sparse weights by a second shadow subset and a third shadow subset of the shadow weights, respectively, in response to the location exceeding the high location threshold; and
replacing the second sparse subset and a fourth sparse subset of the one of the N sets of the sparse weights by the second shadow subset and a fourth shadow subset of the shadow weights, respectively, in response to the location being between the low and high location thresholds, the location being at center of the fourth shadow subset.

15. The method of claim 14 wherein replacing the N sets of sparse weights further comprises:
storing the N sets of the sparse weights.

16. The method of claim 11 wherein asserting a sparse update enable comprises:
estimating a short-term power of the far-end input;
estimating a long-term power of the far-end input; and
enabling adaptation of the shadow filter in response to the short-term power exceeding an indication of the long-term power.

17. The method of claim 11 wherein asserting a sparse update enable comprises:
computing a main coupling factor for the main filter and a shadow coupling factor for the shadow filter; and
detecting the double talk condition in response to the main coupling factor being less than an indication of the shadow coupling factor.

18. The method of claim 17 wherein asserting a sparse update enable further comprises:
estimating a main error power of a main error determined from the main output and the near-end input;
estimating a shadow error power of a shadow error determined from the shadow output and the near-end input; and
detecting the impulse response change in response to the main error power exceeding an indication of the shadow error power.

19. The method of claim 18 wherein asserting a sparse update enable further comprises:
combining the detected double talk and the impulse response change to assert the sparse update enable.

20. The method of claim 16 wherein enabling adaptation of the shadow filter comprises enabling an affine projection (AP) adaptation of the shadow filter.

21. An article of manufacture comprising:
a machine-accessible medium including data that, when accessed by a machine, causes the machine to perform operations comprising:
asserting a sparse update enable in response to detecting at least one of a double talk condition and an impulse response change in an echo channel, the echo channel receiving a far-end input and a near-end input; and
transferring shadow weights of a shadow filter to N sets of sparse weights in a main filter according to the sparse update enable, the main filter filtering the far-end input non-adaptively to generate a main output, the shadow filter filtering the far-end input adaptively to generate a shadow output and estimating delays of peaks of the sparse weights.

22. The article of manufacture of claim 21 wherein the data causing the machine to perform updating the N sets of sparse weights comprises data that, when accessed by the machine, causes the machine to perform operations comprising:
detecting N peak locations of N peaks in the shadow weights; and
replacing the N sets of sparse weights based on the shadow weights according to the N peak locations.

23. The article of manufacture of claim 22 wherein the data causing the machine to perform detecting the N peak locations comprises data that, when accessed by the machine, causes the machine to perform operations comprising:
storing the shadow weights in a shadow buffer;
identifying a location of a maximum absolute value of the shadow weights stored in the shadow buffer, the location corresponding to one of the N peak locations; and
nullifying a subset of shadow weights located around the location, the nullified subset being written back to the shadow buffer.

24. The article of manufacture of claim 23 wherein the data causing the machine to perform replacing the N sets of sparse weights comprises data that, when accessed by the machine, causes the machine to perform operations comprising:
comparing the location with a low location threshold and a high location threshold;
replacing a first sparse subset of one of the N sets of the sparse weights by a first shadow subset of the shadow weights in response to the location being less than the low location threshold;
replacing a second sparse subset and a third sparse subset of the one of the N sets of the sparse weights by a second shadow subset and a third shadow subset of the shadow weights, respectively, in response to the location exceeding high location threshold; and replacing the second sparse subset and a fourth sparse subset of the one of the N sets of the sparse weights by the second shadow subset and a fourth shadow subset of the shadow weights, respectively, in response to the location being between the low and high location thresholds, the location being at center of the fourth shadow subset.

25. The article of manufacture of claim 24 wherein the data causing the machine to perform replacing the N sets of sparse weights further comprises data that, when accessed by the machine, causes the machine to perform operations comprising:

storing the N sets of the sparse weights.

26. The article of manufacture of claim 21 wherein the data causing the machine to perform asserting a sparse update enable comprises data that, when accessed by the machine, causes the machine to perform operations comprising:

estimating a short-term power of the far-end input;
estimating a long-term power of the far-end input; and
enabling adaptation of the shadow filter in response to the short-term power exceeding an indication of the long-term power.

27. The article of manufacture of claim 21 wherein the data causing the machine to perform asserting a sparse update enable comprises data that, when accessed by the machine, causes the machine to perform operations comprising:

computing a main coupling factor for the main filter and a shadow coupling factor for the shadow filter; and
detecting the double talk condition in response to the main coupling factor being less than an indication of the shadow coupling factor.

28. The article of manufacture of claim 27 wherein the data causing the machine to perform asserting a sparse update enable further comprises data that, when accessed by the machine, causes the machine to perform operations comprising:

estimating a main error power of a main error determined from the main output and the near-end input;
estimating a shadow error power of a shadow error determined from the shadow output and the near-end input; and
detecting the impulse response change in response to the main error power exceeding an indication or the shadow error power.

29. The article of manufacture of claim 28 wherein the data causing the machine to perform asserting a sparse update enable further comprises data that, when accessed by the machine, causes the machine to perform operations comprising:

combining the detected double talk and the impulse response change to assert the sparse update enable.

30. The article of manufacture of claim 26 wherein the data causing the machine to perform enabling adaptation of the shadow filter comprises data that, when accessed by the machine, causes the machine to perform operations comprising enabling an affine projection (AP) adaptation of the shadow filter.

31. A system comprising:

a main filter having N sets of sparse weights to filter non-adaptively a far-end input in an echo channel, the main filter generating a main output;
a shadow filter having shadow weights to filter the far-end input to adapt to an impulse response change in the echo channel, the shadow filter generating a shadow output and estimating delays of peaks in the sparse weights; and
a control logic coupled to the main filter and the shadow filter to detect one of a double talk and the impulse response change, the control logic comprising:
an enable generator to assert a sparse update enable in response to detecting at least one of a double talk condition and the impulse response change, and
a main weight updater coupled to the enable generator to transfer shadow weights of a shadow filter to the N sets of sparse weights according to the sparse update enable.

32. The system of claim 31 further comprising:

a send input decoder to receive encoded speech from a near end; and
a send output encoder to provide speech compression.

33. The system of claim 32 further comprising:

a receiver input decoder to decompress speech data received from a far end; and
a receiver output encoder to encode linear data samples from the echo channel, the encoded linear data samples being sent out to the near end.

34. The system of claim 33 wherein the send input decoder is one of a μ-Law and A-Law decoder.

35. The system of claim 34 wherein the send output encoder compresses speech data from the echo channel, the compressed speech data being sent to the far end.

* * * * *